United States Patent [19]

Degenne

[11] Patent Number: 4,567,365
[45] Date of Patent: Jan. 28, 1986

[54] SENSOR OF ENERGY FLUX, IN PARTICULAR HEAT FLUX AND VISIBLE AND INFRARED RADIATION

[75] Inventor: Michel Degenne, Clermont, France

[73] Assignee: Isover Saint-Gobain, Courbevoie, France

[21] Appl. No.: 527,843

[22] Filed: Aug. 30, 1983

[30] Foreign Application Priority Data

Aug. 30, 1982 [FR] France ................... 82 14767

[51] Int. Cl.⁴ .............. H01L 27/16; G01J 5/14
[52] U.S. Cl. ...................... 250/338; 136/224; 374/179
[58] Field of Search ............ 250/338 R; 374/179, 374/121, 30, 113; 136/225, 224

[56] References Cited

U.S. PATENT DOCUMENTS 3,765,238  10/1973  Sumikama et al. ............ 374/30
4,049,469  9/1977   Kolomoets et al. ........... 136/225
4,197,738  4/1980   Degenne ...................... 374/30

FOREIGN PATENT DOCUMENTS 0003271  8/1979   European Pat. Off. .
0170580  10/1982  Japan ......................... 136/225

Primary Examiner—Alfred E. Smith
Assistant Examiner—Constantine Hannaher
Attorney, Agent, or Firm—Oblon, Fisher, Spivak, McClelland & Maier

[57] ABSTRACT

A sensor for measurement of an energy flux and in particular a sensor for measurement of a heat flux or measurement of visible or infrared radiation. The energy flux sensor includes deposits of a first metal in the shape of plates on each of the faces of a substrate, metal-coated holes of the same first metal through the substrate joining one face to the other and surface elements of another metal having thermoelectric properties in relation to the first metal, placed in the thickness of the substrate. This sensor, alone or associated in series with other sensors, makes it possible to measure the thermal properties of certain construction materials, insulating materials in particular. It also makes it possible, when covered with an absorbing coating, to measure visible or infrared radiation.

20 Claims, 7 Drawing Figures

FIG_4

SENSOR OF ENERGY FLUX, IN PARTICULAR HEAT FLUX AND VISIBLE AND INFRARED RADIATION

BACKGROUND OF THE INVENTION

1. Field of the Invention

This invention relates in a general way to the measurement of an energy flux and in particular to the measurement of a heat flux, i.e., to the determination of the amount of heat that passes per unit of time and surface through a wall and to the measurement of visible or infrared radiation and further relates to a device for measuring an energy flux comprising a heat flux meter, i.e., a heat flux measuring apparatus, used particularly for measuring the conductivity or thermal resistance of insulating materials or construction elements.

2. Discussion of the Background

It is known that the measurement of the thermal properties of some light and thick insulating materials requires the use of a device of the type indicated above which has a large measuring surface.

Several types of heat flux meters have already been developed to make these measurements. One of these flux meters, described in European Pat. No. 0003271, comprises a substrate of electrical insulating material in which a network of through holes and several thermocouples associated in series are provided. The hot and cold junctions of the thermocouples are metal coatings, particularly of copper and nickel respectively, deposited on the opposite faces of the substrate while the conductors of each thermocouple are formed by metal coatings deposited respectively on the opposite faces of the substrate and on the walls of the adjacent holes which go through said substrate, on the one hand, to connect the hot and cold junctions to one another and, on the other hand, to connect the thermocouples in series.

It is then possible to take at the terminals of this circuit in series a voltage that is the sum of the electromotive forces generated by all the thermocouples and which is a function of the difference between the temperatures prevailing respectively on both sides of the substrate.

With the value of this voltage it is possible to determine the heat flux going through the flux meter in a way known in the art.

This flux meter already represented a great step in comparison with previous flux meters in which the conductors consisted of sections of wire inserted in the substrate holes and then soldered at suitable locations. Actually, it eliminated the wires requiring spot manual placing and soldering operations by using metal deposits that can be performed in the aggregate, i.e., without spot operations and automatically by more reliable, perfectly reproducible metal-coating and photoetching techniques making it possible to increase the number of junctions without increasing manufacturing work. This results in:

- the possibility of making flux meters with large surfaces and various shapes, fast series manufacturing with good geometric or electric reproducibility, uniformity in making the junctions,
- absence of excess thickness on the faces of the substrate by elimination of soldering,
- a great sensitivity by increasing the density of the junctions, i.e., increasing the number of junctions per unit of surface,
- an integration of the surface temperature with metal strips forming surface conductors and making of two planes constituting the hot and cold faces of the substrate, these two planes exhibiting a better isothermicity.

However, for reasons of convenience and cost in making metal deposits, in particular on the walls of holes that go through the substrate, reasons that essentially relate to the fact that metal-coating shops, developed above all for making printed circuits, are not currently equipped for depositing some metals, the choice of metals to be deposited is limited and in making these flux meters metal couples must often be chosen whose thermoelectrical output is not necessarily the best.

Further, the flux meter described above has holes alternately coated with one metal and the other metal of the thermocouple, which complicates manufacturing.

Moreover, the risk of creating heat short circuits by multiplying the number of junctions per unit of surface limits the increase in the sensitivity.

SUMMARY OF THE INVENTION

This invention aims at remedying the drawbacks of the flux meters described above, namely, the thicknesses that are difficult to reduce and which generate lateral heat leaks and a certain temperature lag, density of junctions that is impossible to increase without risk of heat short circuits, a limited choice of metals forming the thermocouple.

The invention also aims at providing a flux meter that can be used for measuring a heat flux but also for measuring other energy fluxes, particularly visible light or infrared radiation.

The invention further proposes a new sensor that can be used to make a flux meter using elements that are already prefabricated for the electronics industry and available on the market and/or metal coatings currently used for the needs of the electronics industry, and therefore less expensive and not requiring special operations or investments, making possible a choice of metals or alloys forming a high-performance thermocouple, wherein the density of the thermoelectric junctions can be increased, in which all the holes going through the substrate are coated with the same metal.

This new sensor retains the advantages of flux meter sensors described above, but it further offers additional advantages and results particularly in better performances and a better sensitivity.

The energy flux sensor, formed by a substrate of a thermal and electrical insulating material, coated on each of its parallel faces perpendicular to the flux with plates of a first metal or alloy and pierced by holes each connecting a plate of one face to a single plate connectable to the other face, holes whose walls are also coated with the same first metal, is such that it has, in the thickness of said substrate and parallel to its faces, separate connecting elements, of a second metal or alloy having thermoelectric properties in relation to the first metal, two points of each of these connecting elements constituting said hot and cold junctions of a thermocouple, being connected respectively to a metal plate of each face of the substrate by a coating of the first metal or alloy on the wall of the holes joining each of said two points to the plates, said two plates thus being connected by connecting elements previously separated.

For reasons of symmetry of the system, the connecting elements belonging to one or more planes parallel to the faces of the substrate are respectively and advantageously located half way between these two faces, or have parts arranged symmetrically in relation to the plane located half way between these two faces.

Also advantageously, the plates on each face of the substrate are arranged perpendicular to the respective hot and cold junctions to which they are connected and the holes directly connecting two plates are formed in the faces of the substrate.

To avoid heat bridges between contiguous hot and cold junctions, the connecting elements that contain them are cut so that the length of the metal-coated path between said two junctions is lengthened.

For the same reason, on each plate, the path between the entrance of the hole joining it to a plate of the other face and the entrance of the hole joining it to a hot or cold junction is lengthened by insulating tracks made in the strip and forming baffles.

In an embodiment, each connecting element is in a single part and belongs to a single plane located in the thickness of the substrate.

In another embodiment, connecting elements are in several parts which belong to different intermediate planes placed in the thickness of the substrate.

These sensors are advantageously associated in series to form a flux meter.

This flux meter can be placed in a heat flux, then delivering a potential difference at its terminals which is the expression of this heat flux. Covered on one of its faces, at least on the strips, with a coating absorbing a visible or infrared radiation and transforming it into heat and having the other face kept at constant temperature, this flux meter, placed in the path of a visible or infrared radiation, delivers at its terminals a potential difference that characterizes the radiation.

BRIEF DESCRIPTION OF THE DRAWINGS

Other characteristics and advantages of the invention will appear in the following description given solely by way of example and with reference to the accompanying drawings in which.

DESCRIPTION OF THE PREFERRED EMBODIMENTS

Figure 1:
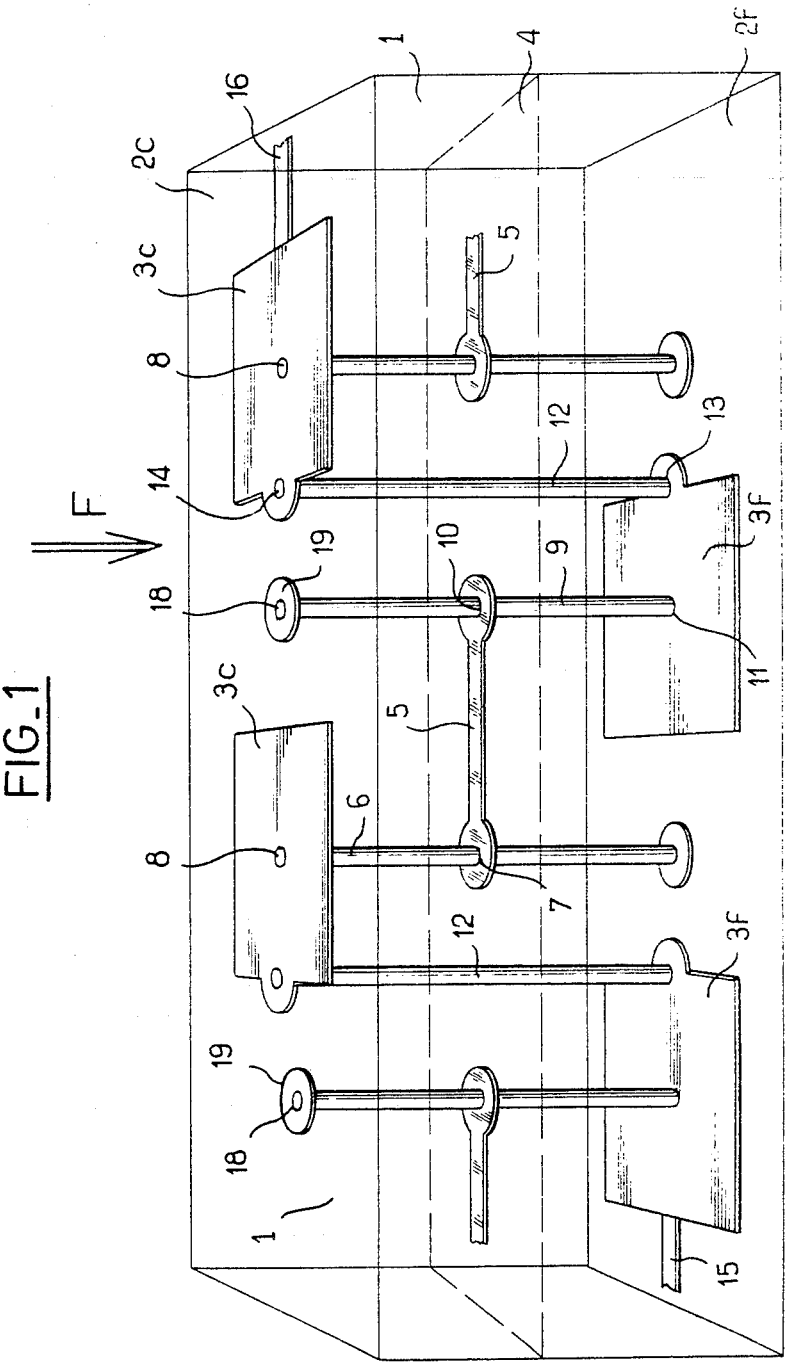
FIG. 1 is a skeleton diagram in perspective showing the arrangement of the various elements of the sensor that can be used in a flux meter.

FIG. 1 shows a portion of the energy flux sensor that can be used in a flux meter used to measure heat or radiation flux. This sensor comprises a substrate 1 of material that is homogeneous, isotropic, electrical and thermal insulating, stable in time, such as an epoxy glass, in the form of a rigid or flexible single plate or several plates side by side. On each of its faces 2c and 2f, is placed perpendicular to the energy flux to be measured and directed along arrow F, this substrate is coated with metal plates such as 3c and 3f, for example, rectangular, juxtaposed and electrically insulated from one another, of a first metal or alloy; for example, copper.

Metal connecting elements 5, separated from one another, are placed in an intermediate plane 4 parallel to faces 2c and 2f and located in the thickness of substrate 1. The metal or alloy of these connecting elements 5 is selected to have thermoelectric properties in relation to the first metal of plates 3c and 3f, and, for example, is of constantan if the first metal is copper.

Holes 6, made through substrate 1 in the direction of face 2c, and whose walls are coated with a layer of metal or alloy, join a point or zone 7 of each connecting element 5 to a point or zone 8 belonging to a plate 3c and located in the region of the center of this plate.

Holes 9, made through substrate 1 in the direction of face 2f, whose walls are coated with a layer of metal or alloy, join another point or zone 10 of each connecting element 5 to a point or zone 11 belonging to a plate 3f and approximately centered on said plate.

Moreover, each unit thus constituted, namely a plate 3c, a metal-coated hole 6, a metal connecting element 5, a metal-coated hole 9, a plate 3f, is electrically connected to the unit of the same type that follows it and the one that precedes it. For this purpose, metal-coated holes 12 originate on the inside of plate 3c of each unit at a point or zone 14, preferably located on its edge, so through the entire thickness of substrate 1 and come out on its face 2f at a point or zone 13 belonging to plate 3f of the preceding unit, preferably on its edge.

The metal or alloy that coats holes 12 is selected particularly for its good electrical conduction while the metal or alloy that coats holes 6 and 9 is selected especially for its good heat conduction.

To simplify the making of this sensor, it is advantageous that the metal or alloy coating all the holes and that of all the plates be the same. Copper particularly is selected, the constantan having good thermoelectric properties in relation to copper then forming connecting elements 5, but other metals or alloys forming thermoelectric couples can also be selected.

The two points 7 and 10 of each metal connecting element 5, located at the point of contact of the two different metals or alloys, respectively constitute the hot and cold junctions of a thermocouple. The various thermocouples thus constituted are connected to one another in series, by metal-coated hole 6, strip 3c, metal-coated hole 12, strip 3f and metal-coated hole 9.

Figure 4:
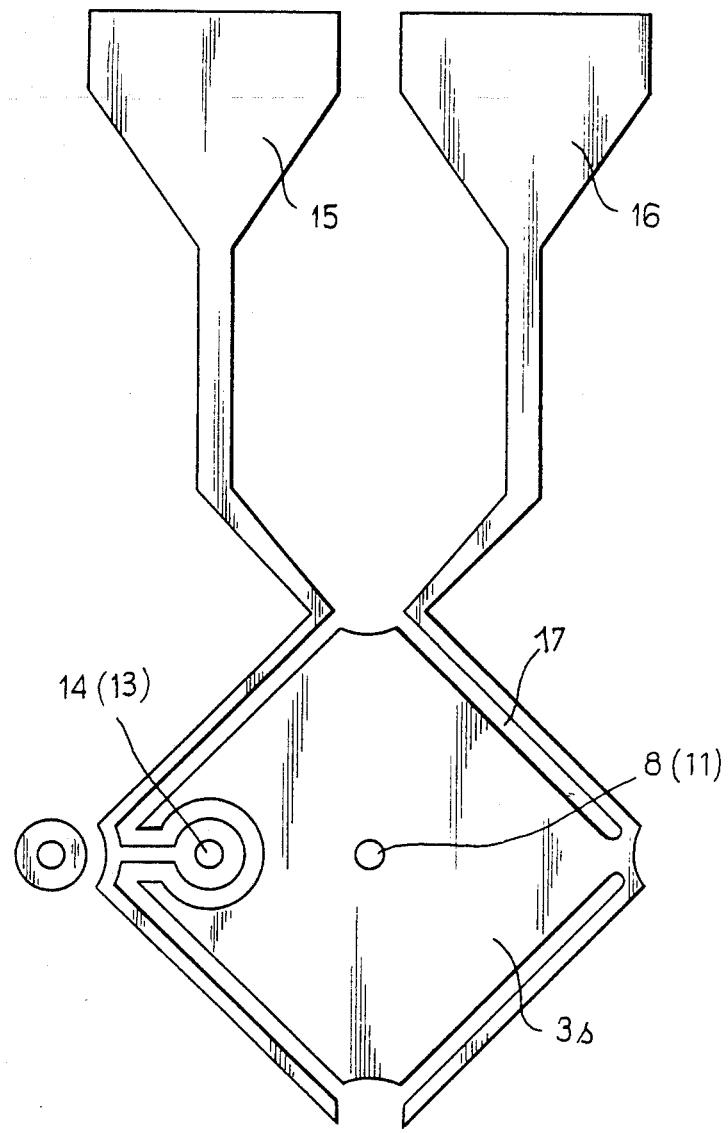
FIG. 4 is a diagram of the electric conductors at the terminals of the flux meter.

When temperature differences exist between hot junctions 7 and cold junctions 10 of each thermocouple, a potential difference can be taken at the ends of the series of thermocouples. As is known, particularly from patent EP No. 0003271 already cited, the conductors at the ends of the series are advantageously also metal deposits 15, 16, as shown in FIG. 1 and FIG. 4.

Advantageously, for reasons of symmetry of the system, intermediate plane 4 is located half way in the thickness dimension of substrate 1.

The unit described above functions as follows. When a plate of substrate 1 coated on its faces with plates 3c and 3f, pierced by metal-coated holes 6, 9, 12 having metal connecting elements 5 in its median plane as described above, is placed in an energy flux, for example an outside heat flux perpendicular to its faces 2c and 2f and also to its plane 4 containing hot junctions 7 and cold junctions 10, i.e., directed along arrow F, a temperature gradient is established between the two faces 2c and 2f. The metal plates, 3c and 3f respectively, which belong to faces 2c and 2f are therefore brought to different temperatures, Tc and Tf, respectively. The heat sensed on the face 2c which we will call "hot" by plates 3c is transmitted to points 7 of metal connecting elements 5 located in the median plane by the thermal conductive metal coatings of holes 6. In the same way, the "cold" sensed on the cold face 2f by plates 3f is transmitted to points 10 of the metal connecting elements 5 of median plane 4. As a result, there is a temperature difference between the hot junctions 7 and cold junctions 10 of the various thermocouples, a temperature difference that is the representation of the temperature difference existing between the two faces 2c and 2f. Each thermocouple therefore generates a potential difference, and the various thermocouples are electrically associated in series by holes 6, 9, 12 and by plates 3c and 3f, making it possible to obtain at the terminals of the sensor unit a potential difference that characterizes the heat flux in which the sensor is immersed.

For better functioning, it is advantageous to promote heat conduction between each plate 3c or 3f and hot junction 7 or cold junction 10 to which it is connected. Consequently, when metals or alloys to be deposited are chosen, it is preferable to deposit metals or alloys that are very good heat conductors in holes 6 and 9. On the other hand, it is important to limit the heat conduction between consecutive hot junction 7 and cold junction 10 belonging to the same thermocouple, this conduction tending to reduce the temperature difference between said two junctions, to therefore reduce the sensitivity of the sensor. In the same way, it is important to avoid as much as possible equalizing temperatures Tc and Tf between said hot face 2c and said cold face 2f of substrate 1 by heat conduction through metal-coated holes 12. Modifications of the geometric shape of plates 3c and 3f and of metal connecting elements 5 should work in this direction.

Figure 2:
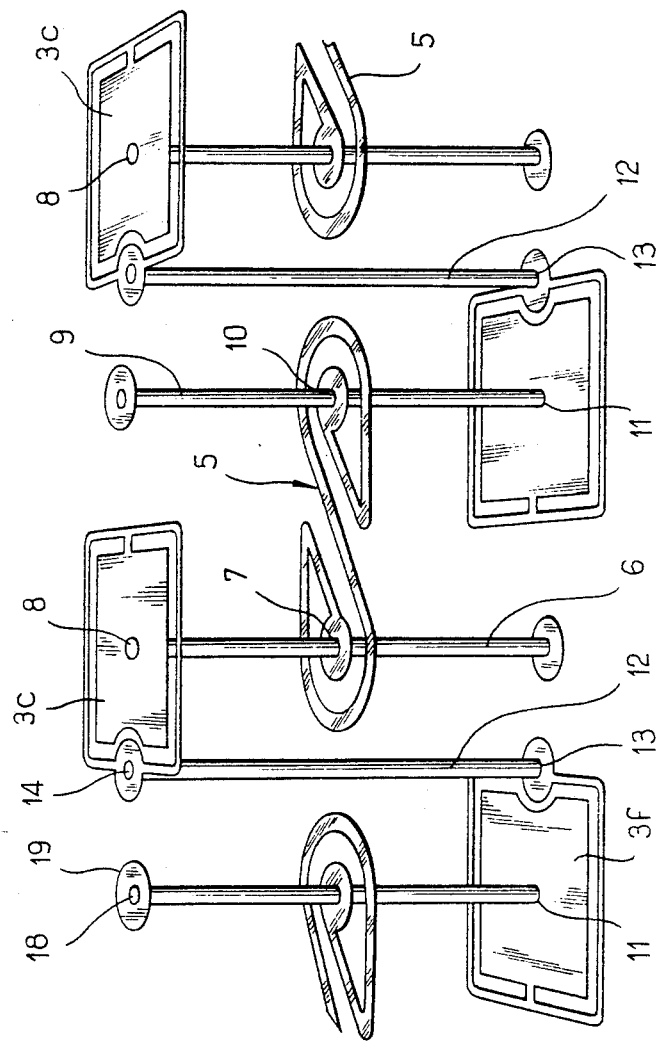
FIG. 2 is a diagram giving an example of the advantageous shapes of the metal coatings.

Thus, FIG. 2 shows one of the possible modifications of shapes to reduce heat conduction between the two faces 2c and 2f on the one hand, between hot junction 7 and cold junction 10, on the other hand. These modifications consist in lengthening as much as possible the metal-coated path leading, on the one hand, from points 8 belonging to hot face 2c to points 11 belonging to cold face 2f, and on the other hand, from cold junctions 7 to hot junctions 10. This lengthening of the path is obtained by making thermal insulating tracks in plates 3c and 3f creating baffles between point 8 and point 14 of plates 3c and between point 11 and point 13 of plates 3f. The shape of baffles can, of course, vary.

FIG. 2 gives an example of the shape in which insulating track 17 runs for several tenths of a millimeter along the edges of the strips and is open on the side opposite points 13 and 14.

In regard to connecting elements 5, this lengthening of the path is obtained by giving said elements an approximately S shape as shown in FIG. 2, hot junctions 7 and cold junctions 10 being located at the ends of the line of the S.

In comparison with the flux meters of the prior art, particularly that described in EP No. 0003271, this new embodiment introduces a third plane, intermediate plane 4 reserved solely for hot and cold junctions and free of the strips that serve for sensing the flux. Thanks to this additional plane 4, a greater density of junctions per unit of surface than before is possible. To improve the sensitivity of the flux meter, plates 3c, on the one hand, and 3f, on the other, are overlapped, as also are metal connecting elements 5.

Figure 3:
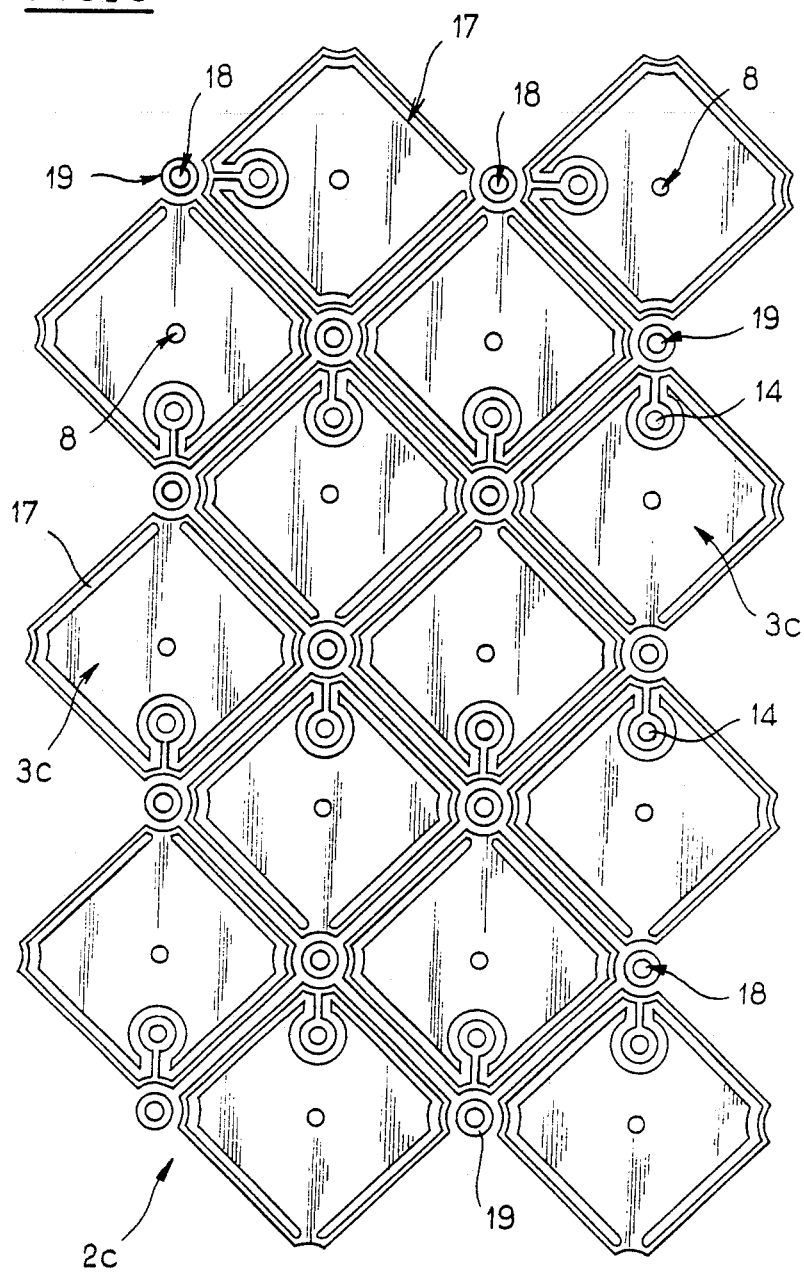
FIG. 3 is a top view of the sensor showing the arrangement of the coatings on one face.

The arrangement of the plates, for example 3c, can be selected as shown in FIG. 3. Each plate 3c has a rhombic shape and is surrounded by other plates that are practically side by side. Insulating tracks or baffles 17 are found in each plate.

A point, which is white in the figure and represents entrance point 8 of metal-coated hole 6, appears in the center of each rhombus. Another point which is the entrance 14 of metal-coated hole 12 is surrounded by baffle 17 which forms a circular enclave in a corner and on the inside of each rhombus. New points 18, surrounded by a washer 19, appear on the outside of each rhombus. For ease in making, metal-coated holes 6 and 9, described so far as going through only a half thickness of substrate 1, actually go all the way through and come out at hole 18 on the other face, and washer 19 is a metal-coated washer protecting the metal deposit on the inside of the hole, which is useful during manufacturing.

The plates on the other face of the substrate have the same arrangement, but are staggered in relation to those of the first face so that the centers of the rhombic strips of the second face correspond to holes 18 surrounded by their washer 19 on the first face. This running of holes 6 and 9 all the way through also appears in FIGS. 1 and 2.

Advantageously, as shown in FIG. 4, the series of thermocouples will loop on a plate either on the cold face or hot face. This output plate 3s will be connected to two electric output conductors and its layout will be slightly modified for this reason in comparison with the layouts shown in FIG. 3 to avoid a short circuit. Thus, the conductive edge bordering each plate, located between insulating track 17 and the edge of said plate will be interrupted, for example, on the side opposite that of the entrance of conductors 15 and 16. The two circuits will then be separated on plate 3s, conductor 15 will be in contact with an abutment 14 (or 13), while conductor 16 will be in contact with a zone 8 (or 11).

To make this sensor, it is possible to make the metal coatings by photoetching either in the form of plates 3c, 3f, or in the form of connecting elements 5 in three layers on the two thicknesses of the insulating substrate.

It is advisable to select the two thicknesses of substrate so that the inside deposit, for example, of constantan is centered in relation to plates 3c and 3f, for example of copper, to obtain a symmetrical system.

The two coated thicknesses are then pressed and glued, with superposition, to obtain the structure described and shown in FIGS. 1 and 2, then the holes are drilled and metal-coated, for example, with copper.

Depending on the availability of materials on the market, manufacturing can be simplified by using a first support of epoxy glass whose thickness is half the thickness of substrate 1, coated with copper on one face and associating it with a second support of the same thickness already coated with copper on one face and constantan on the other face.

Thanks to photoetching techniques, densities of 200 cold junctions and 200 hot junctions per $dm^2$ can be obtained without any problem. Because of the possible great density of junctions, because of the great ease of depositing the same metal in all the holes, and because of the great freedom of choice of a high-performance thermocouple, even better performances are obtained than with the sensor described in EP No. 0003271.

Thus, a flux meter of the type 0.7 mm thick is 1.35 times more sensitive than a flux meter of the old type (that of patent EP No. 0003271) 2.4 mm thick with the same density of junctions.

Coating thicknesses on the hole walls and as plates of at least 5 microns ($\mu$m) will be used to avoid rupture and generally are on the order of 5 to 50 $\mu$m, and the substrate can have a thickness as low as 0.1 mm and obviously be greater and even amount to several mm, for example, 2, 3 or even 10 mm.

Figure 5:
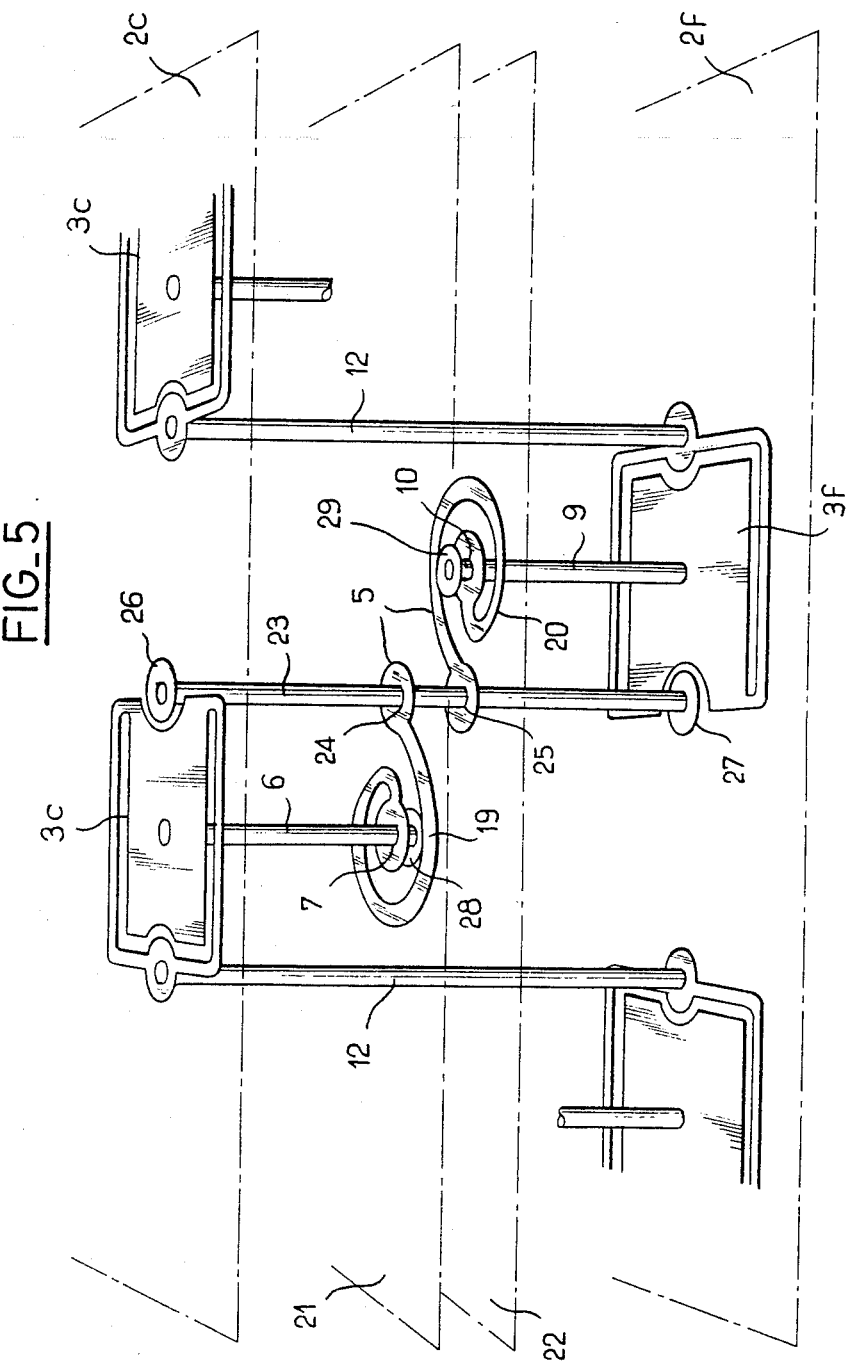
FIG. 5 is a diagram of a variant sensor.
Figure 6:
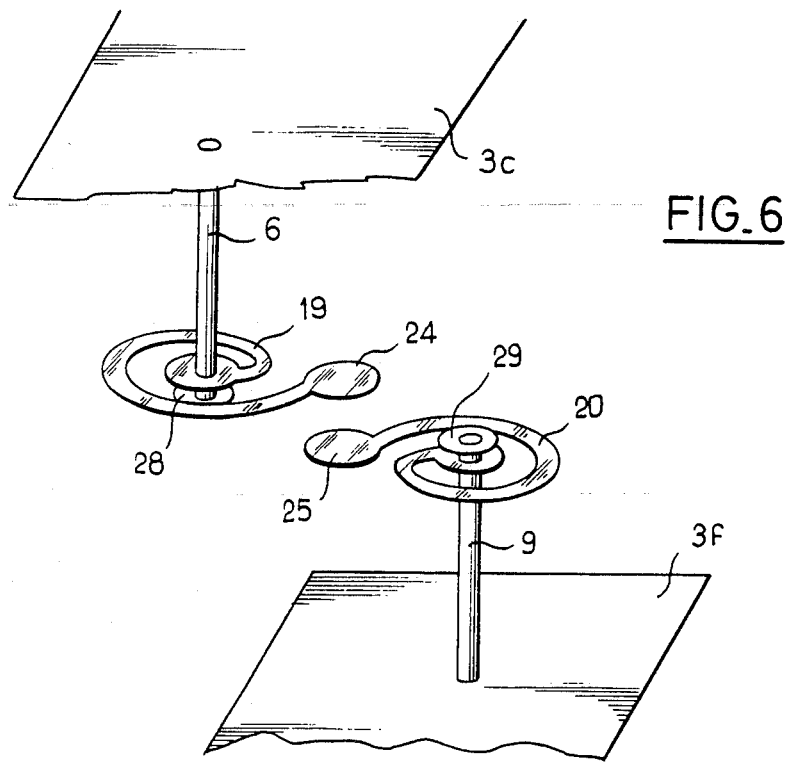
FIG. 6 is a diagram according to this variant of FIG. 5 showing a form of particular coating.
Figure 7:
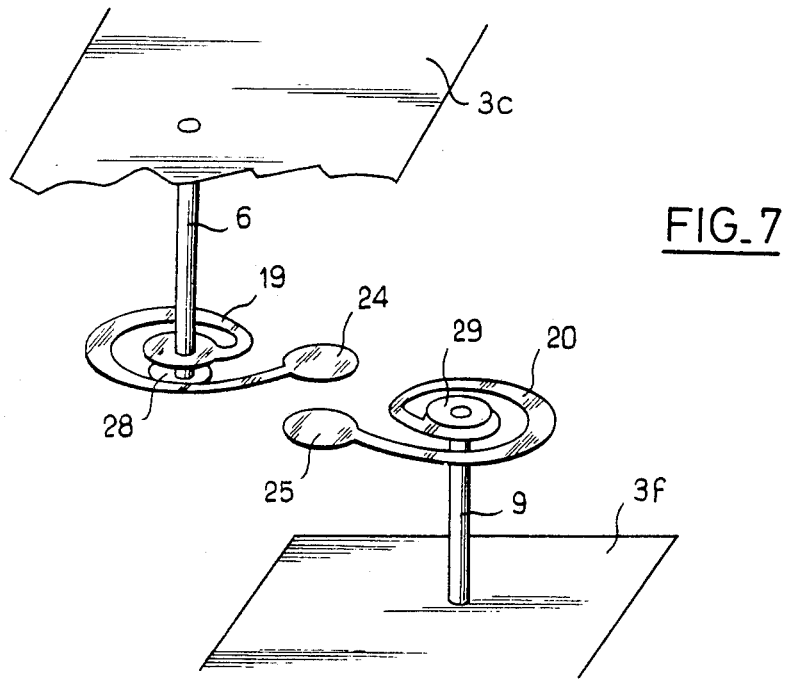
FIG. 7 is a diagram according to the variant of FIG. 5 showing another form of coating.

The variant sensors shown in FIGS. 5, 6 and 7 can be made to improve sensitivity even more.

In these variants, a metal connecting element 5, placed in the thickness of the substrate, is no longer in a single part and no longer belongs to a single intermediate plane 4, preferably half way between faces 2c and 2f of substrate 1, but does in several parts belong to different intermediate planes located in the thickness of the substrate, these different parts of the same connecting element 5, however, being electrically connected to one another.

In the variants shown, a surface element is formed of two parts 19 and 20, each part, for example 19, belonging to an intermediate plane, for example 21, located in the thickness of the substrate, distinct from intermediate plane 22 which contains the other part, for example 20. These separate parts 19, 20, located in two different planes 21 and 22, are electrically connected by the metal coating of a hole 23 made in substrate 1 and connecting two of their points, 24 and 25, or to facilitate manufacture, of a hole 23 going through all of substrate 1 and crossing the two parts 19 and 20. Advantageously, the outputs of this hole 23 on faces 2c and 2f of substrate 1 are surrounded by a metal washer 25, 27 useful for manufacturing. To the extent that connecting element 5 is in more than two parts, several holes such as hole 23 are necessary.

As for the embodiments described above, each connecting element 5 is connected, on the one hand, to a plate 3c of face 2c by the metal coating of hole 6 and, on the other hand, to a strip 3f by the metal coating of hole 9. While in the preceding embodiments, the manufacturing method led to making holes 6 and 9 going through the entire thickness of substrate 1, in this variant embodiment, holes 6 and 9 no longer go all the way through and connect only two points or zones 7 and 10 of a metal connecting element 5, respectively, to a plate 3c and 3f without extending beyond said metal connecting element 5. Advantageously, the ends of holes 6 and 9 on the side of connecting elements 5 are edged with washers 28, 29.

As in the preceding embodiments, an effort is made to reduce heat conduction between points 7 and 10 of the same connecting element 5, even if this surface element 5 is in several parts. As above, it is given a shape that lengthens the distance between points 7 and 10, for example, in an S shape, each part constituting a portion of the S, particularly a half S in the case of two parts 19 and 20. Because of the possibility of using several intermediate planes containing parts of connecting elements 5, the freedom of choice of the shape and arrangement of said parts is even greater than above.

To make this variant sensor, for example, with connecting elements 5 in two parts, two identical thicknesses of substrate are used, metal-coated identically on their two faces, respectively with each of the two metals intended to constitute the thermocouples, for example, Cu and Ct. Holes 6 and 9 are made through each thickness, a first metal coating, for example of copper, is made in holes 6 and 9 and washers 28 and 29 are formed.

The design of the parts belonging to connecting elements 5 is made to appear by photoetching on the face coated, for example, with Ct. The two thicknesses of substrate are put together with an electrical and thermal insulating adhesive by placing opposite one another the two faces coated with Ct or metal or alloy performing the same role if a thermocouple other than Cu/Ct is chosen. Two series of holes are made through the two assembled thicknesses that constitute substrate 1, on the one hand, holes 12 for joining faces 2c and 2f and, on the other hand, holes 23 going through the two parts 19 and 20 of the same element 5. When a Cu/Ct couple has been chosen, the newly made holes are metal-coated with Cu, which at the same time adds an extra thickness of Cu on faces 2c and 2f, and said faces are etched to make the paths there to bring out plates 3c and 3f.

The two parts forming metal connecting elements 5 can be symmetrical and, after assembly, constitute S's, as in the case of FIGS. 5 and 6, each part being a half S, or can be exactly identical to constitute, after assembly, metal elements 5 such as those shown in FIG. 7, i.e., from a top view having an omega ($\omega$) shape. This sensor, including omega-shaped metal connecting elements 5, offers the advantage of being obtained from two identical thicknesses of substrate, carrying the same coatings, having the same shape, which simplifies manufacturing.

In this variant, the deposits assuring electrical conduction and the deposits assuring heat conduction are made in distinct stages, which makes it possible to deposit for each function, heat conduction and electrical conduction, thicknesses of deposits that are best suited without a useless excess thickness promoting heat short circuits.

The range of the thickness of the coating and thickness of the substrate are on the same order as those provided in the first variant. Associations of sensors are also done as above.

As is known, temperature probes, for example consisting of additional deposits of metals or alloys forming couples, can also be deposited, particularly in median plane 4, or multiple intermediate planes, or again in additional planes. These sensors or flux meters, placed perpendicular to a heat flux, deliver a potential difference that is the expression of the heat flux.

Juxtaposed on a wall or a pipe and each delivering an indication, these sensors or flux meters can be used to measure heat fluxes through various zones of said wall or said pipe, particularly to detect and locate possible heat leaks.

The sensors or flux meters can also measure other energy fluxes, particularly visible or infrared radiation, provided they are associated with a radiated energy-to-heat transformer, said heat thus produced then being sensed and used by the sensors or flux meters as indicated above.

In the case of visible or infrared radiation, the energy transformer can be merely a coating of one face of the flux meter described above, which heats up by absorbing said radiation. Thus, a black coating deposited on one face, for example, the hot face, at least on plates 3c, generates heating of said strips which causes the delivery of a potential difference at the terminals of the sensor or flux meter.

Advantageously, the other face of the sensor or flux meter, for example the cold face, is then kept at constant temperature, and it is particularly in contact with a body at constant temperature.

Considering the small surface of washers 19, compared with that of the strips, the surface unit of a face can be coated, for example, with a black metal coating, particularly bone black or simple black paint.

Obviously, numerous modifications and variations of the present invention are possible in light of the above teachings. It is therefore to be understood that within the scope of the appended claims, the invention may be practiced otherwise than as specifically described herein.

I claim:

1. An energy flux sensor, comprising:
   a substrate of a thermal and electrical insulating material, said substrate having on each of first and second faces thereof, parallel and perpendicular to a flux, a plurality of first and second plates of a first metal or alloy, and having a first and second plurality of holes formed in said substrate, said first plurality of holes each respectively connecting one of said plurality of first plates solely to one of said plurality of second plates wherein walls of said first plurality of holes are coated with said first metal or alloy; and
   a plurality of separate connecting elements positioned in said substrate, and parallel to said first and second faces, wherein said separate connecting elements each further comprise a second metal or alloy having thermoelectric properties in relation to said first metal or alloy, and wherein said connecting elements include first and second points, constituting hot and cold junctions, respectively, of a thermocouple, said first and second points being respectively connected to said first and second plurality of plates by a coating of said first metal or alloy on walls of said second plurality of holes formed in said substrate and joining each of said hot and cold junctions to said first and second plates such that said first and second plates are connected by said coating on said walls of said second plurality of holes and the connecting elements.

2. A sensor as claimed in claim 1, wherein said first and said second plurality of plates are arranged perpendicular to said hot and cold junctions.

3. A sensor as claimed in claim 2, wherein said first plurality of holes are perpendicular to said first and second faces of said substrate.

4. A sensor as claimed in claim 1, further comprising a plurality of insulating track members formed on each of said first and second plates.

5. A sensor as claimed in claim 4, wherein said first and second plates have a substantially square shape.

6. A sensor as claimed in claim 4, wherein said plurality of first and second plates are respectively placed side-by-side on said first and second face of said substrate so as to occupy an entire surface portion of said first and second face.

7. A sensor as claimed in claim 6, wherein said first and second plurality of plates are of a rhombus shape and wherein at least one of said first and second plurality of plates further comprises a plurality of insulating tracks forming an enclave located around an abutment of said at least one of said first and second plurality of plates.

8. A sensor as claimed in claim 1, wherein said plurality of first plates has a staggered relation with respect to said plurality of second plates.

9. A sensor as claimed in claim 1, wherein an entrance portion of said second plurality of holes are positioned so as to be centered on said plurality of first and second plates, respectively.

10. A sensor as claimed in claim 1, wherein said thermocouple further comprises copper-constantan.

11. A sensor as claimed in claim 1, wherein said connecting elements further comprise a cut portion such that the length of a metal-coated path between said hot junction and said cold junction is increased.

12. A sensor as claimed in claim 11, wherein the metal-coated connecting elements are in the form of an S wherein said hot and cold junctions form opposite ends of said S.

13. A sensor as claimed in claim 1, wherein said connecting elements lie in a single plane.

14. A sensor as claimed in claim 13, wherein said single plane containing said connecting elements is located half-way between said first and second faces of said substrate.

15. A sensor as claimed in claim 13 or 14, wherein said second plurality of holes extend through said substrate and further comprising a metal-coated washer wherein an entrance of said second plurality of holes is surrounded by said metal-coated washer.

16. A sensor as claimed in claim 1, wherein said connecting elements each further comprise a plurality of parts which lie in intermediate planes, respectively, located in said substrate and wherein said parts are electrically connected.

17. A sensor as claimed in claim 16, wherein said connecting elements further comprise first and second parts which lie in first and second planes located in said substrate.

18. A sensor as claimed in claim 17, wherein said first and second intermediate planes are arranged symmetrically in relation to a plane located half-way between said first and second faces.

19. A sensor as claimed in claim 17, wherein said substrate includes a third hole formed therein and wherein the electrical connection between said first and second parts of said connecting elements is obtained by a metal coating of a wall portion of said third hole.

20. A sensor as claimed in claim 17, wherein said first and second parts of said connecting elements is in the form of a half S such that said first and second parts when assembled form an S or an omega.

* * * * *